(No Model.)

C. WRIGHT.
Whiffletree Hook.

No. 234,449. Patented Nov. 16, 1880.

Witnesses:
A. M. Long.
Geo. W. Moore.

Charles Wright, Inventor,
By Paine, Crofton & Loud,
Attys.

UNITED STATES PATENT OFFICE.

CHARLES WRIGHT, OF SOUTH ELGIN, ILLINOIS.

WHIFFLETREE-HOOK.

SPECIFICATION forming part of Letters Patent No. 234,449, dated November 16, 1880.

Application filed October 6, 1880. (No model.)

*To all whom it may concern:*

Be it known that I, CHARLES WRIGHT, a citizen of the United States, residing at South Elgin, in the county of Kane and State of Illinois, have invented certain new and useful Improvements in Whiffletree-Hooks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of the present invention is to provide a whiffletree-hook simple in construction and effective in operation, preventing by its employment the accidental disengagement of the trace from the hook.

The invention consists in a pivoted or swinging hook having a stirrup-shaped end passing through a ferrule on the whiffletree, and provided with an elongated hook or arm, which enters an opening in said ferrule, to retain the trace. A curved or arc-shaped projection is formed on the ferrule in juxtaposition to the opening for the end of the hook, to prevent the disengagement of the trace in case the hook is forced backward by the trace—as, for example, when the latter becomes slack or the draft is applied in an oblique direction.

Figure 1:
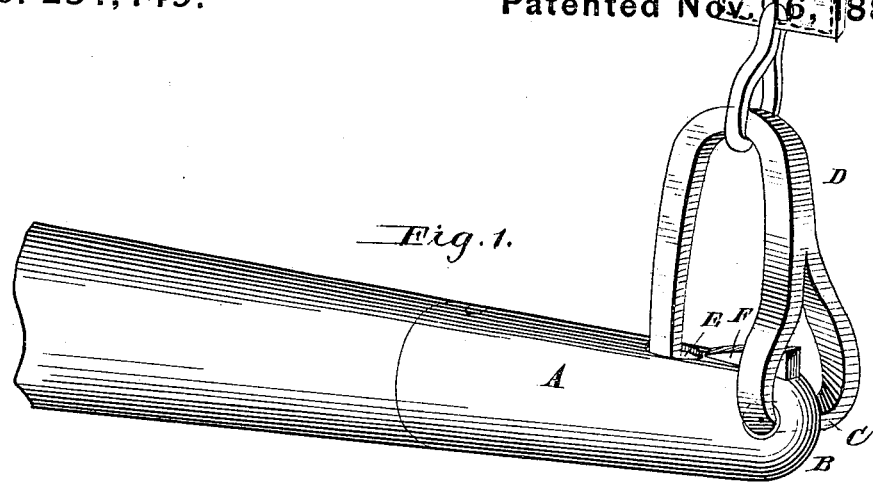
Figure 2:
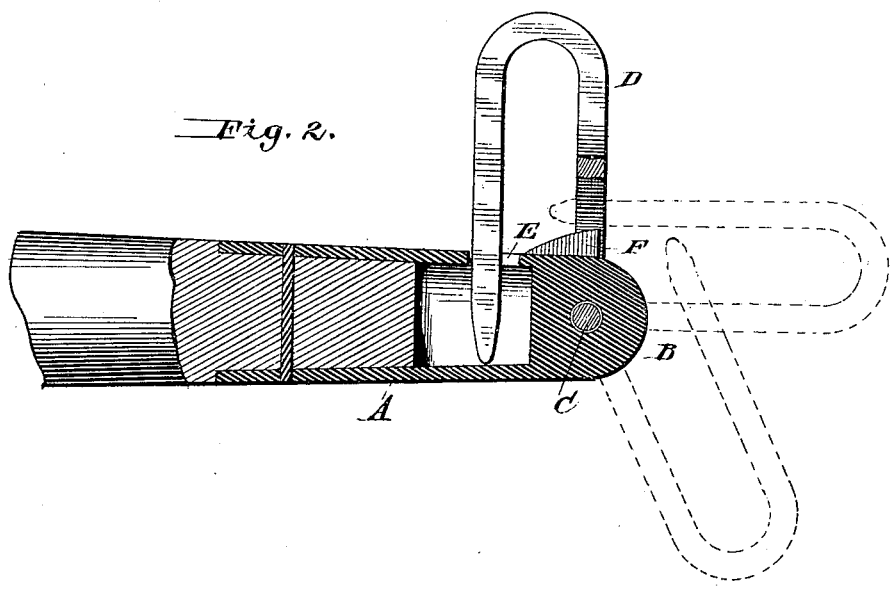

In the drawings, Figure 1 is a perspective view of the whiffletree-hook, and Fig. 2 is a longitudinal section of the same.

The letter A designates a metal ferrule having a closed end head or cap portion, B, provided with a vertical opening. Into this opening is fitted the vertical portion C of the stirrup-shaped rear end of the trace-retaining hook D. Said hook is made with a long front portion, which enters the slot E in the front wall of the ferrule A when the hook is thrown forward to retain the trace.

In juxtaposition to the slot E in the ferrule is formed an arc-shaped or curved projection, F, the curvature whereof is such that the end of the hook, in passing to and from the slot in the ferrule, will glide or move in contact with said projection, or in close proximity thereto.

As shown in Fig. 1 the trace is in a taut condition, this being the case when the draft is applied thereto. The stirrup-shaped end of the hook is in the present instance made to embrace the end of the ferrule and to receive between its two arms the arc-shaped projection F, while the free end of the hook is made to enter into the ferrule until it is arrested by the rear wall thereof. As long as the trace is taut and the pull is in a straight line the hook is maintained in the position shown. When, however, the draft-pull is in an oblique line, the tendency of the hook is to move away from the ferrule, and were it not for the presence of the arc-shaped projection the disengagement of the trace could very easily take place. It will be perceived, however, that such a contingency is avoided altogether, because the hook, when it is moved away from its ferrule by an oblique pull, or by reason of the slackening of the trace, will move in close contact or immediate proximity to the arc-shaped projection, as is shown in Fig. 2, and in doing so there will be no space left between said projection and the end of the hook to permit the slipping out of the trace. The disengagement of the trace can only be effected when the end of the hook passes beyond the outer end of the projection, which can only take place when the hook is thrown backward by hand.

The trace is very easily connected with the hook by throwing the hook clear back and slipping the trace over the free end thereof, when it is securely maintained in position.

The connection of the hook with the ferrule is generally effected by passing it through the eye or opening in the ferrule and then bending it so as to form the arms of the stirrup portion, and subsequently welding or brazing one of said arms to the body portion of the hook, so as to form the complete stirrup. I also propose, however, to make the hook with branched arms projecting on either side of the ferrule, and having eyes for the reception of a bolt passing vertically through the ferrule.

It will, of course, be obvious that a ferrule and hook are intended to be applied to both ends of a whiffletree.

I am aware that it is not broadly new to provide a whiffletree with a trace-retaining hook closing into a slot in an end ferrule, and that a curved projection has been formed on an end head of a whiffletree, so as to operate in connection with a trace-retaining hook.

Having thus described my invention, what I claim is—

The combination of ferrule A, having a front slot, E, arc-shaped projection F, located in juxtaposition thereto, closed end head B, and vertical opening through the same, with the swinging trace-hook D, having stirrup-shaped end and hook portion closing into the slot in the ferrule, as and for the purpose set forth.

In testimony whereof I affix my signature in presence of two witnesses.

CHARLES WRIGHT.

Witnesses:
EDW. P. FLYNN,
C. W. COLE.